(12) United States Patent
Nishida et al.

(10) Patent No.: US 7,068,462 B2
(45) Date of Patent: Jun. 27, 2006

(54) MAGNETIC RECORDING APPARATUS

(75) Inventors: Yasutaka Nishida, Kodaira (JP);
Takehiko Hamaguchi, Fuchu (JP);
Hideki Sawaguchi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 274 days.

(21) Appl. No.: 10/231,264

(22) Filed: Aug. 30, 2002

(65) Prior Publication Data

US 2003/0223147 A1 Dec. 4, 2003

(30) Foreign Application Priority Data

Jun. 3, 2002 (JP) .................................... P2002-160908

(51) Int. Cl.
*G11B 5/596* (2006.01)

(52) U.S. Cl. ................................... 360/78.04
(58) Field of Classification Search ............. 360/78.04, 360/15, 25, 49, 17, 75, 77.02, 77.05, 77.06, 360/77.07, 77.08, 77.11
See application file for complete search history.

(56) References Cited

U.S. PATENT DOCUMENTS

| | | | | |
|---|---|---|---|---|
| 5,757,567 A | * | 5/1998 | Hetzler et al. ................. 360/49 |
| 5,991,104 A | * | 11/1999 | Bonyhard ..................... 360/15 |
| 6,034,829 A | * | 3/2000 | Suzuki et al. ................. 360/25 |
| 6,086,961 A | * | 7/2000 | Bonyhard ..................... 427/547 |
| 6,181,492 B1 | * | 1/2001 | Bonyhard ..................... 360/17 |
| 6,183,893 B1 | * | 2/2001 | Futamoto et al. ......... 428/694 TS |
| 6,212,023 B1 | * | 4/2001 | Bonyhard ..................... 360/15 |
| 6,620,531 B1 | * | 9/2003 | Cheng .................. 428/694 TS |

FOREIGN PATENT DOCUMENTS

| | | |
|---|---|---|
| EP | 97 208 | 3/1987 |
| JP | 58-222468 | 12/1983 |
| JP | 64-48276 | 2/1989 |

* cited by examiner

*Primary Examiner*—David Hudspeth
*Assistant Examiner*—Fred F. Tzeng
(74) *Attorney, Agent, or Firm*—Mattingly, Stanger, Malur & Brundidge, P.C.

(57) ABSTRACT

A method of enhancing the thermal stability of gray codes is disclosed. The gray code block in a servo area is recorded with a combination of two different magnetization directions. When the two different magnetization directions are expressed as "+" and "−", the information "1" is recorded as "++−−" or "−−++" with the information "0" recorded as "+−+−" or "−+−+". Since the filter for gray code demodulation is provided with a perpendicular recording mode, the servo area does not use long-wavelength signals that are susceptible to thermal demagnetization. As a result, thermal stability is enhanced.

9 Claims, 16 Drawing Sheets

RECORDED MAGNETIZATION PATTERN

READ BACK WAVEFORM OF LONGITUDINAL RECORDING

READ BACK WAVEFORM OF PERPENDICULAR RECORDING

TAP COEFFICIENTS

REPRODUCED WAVEFORM
FROM PERPENDICULAR
RECORDING MEDIA

CTF OUTPUT

DIFFERENTIATED WAVEFORM
OF PERPENDICULAR
RECORDING

CTF OUTPUT OF WAVEFORM(A)

REPRODUCED WAVEFORM
FROM LONGITUDINAL
RECORDING MEDIA

CTF OUTPUT

REPRODUCED WAVEFORM
FROM PERPENDICULAR
RECORDING MEDIA

CTF OUTPUT

REPRODUCED WAVEFORM
FROM LONGITUDINAL
RECORDING MEDIA

CTF OUTPUT

DIFFERENTIATED WAVEFORM
OF PERPENDICULAR
RECORDING

CTF OUTPUT OF WAVEFORM

MAGNETIC RECORDING APPARATUS

BACKGROUND OF THE INVENTION

1. Field of the Invention

The present invention relates to a magnetic recording apparatus and a signal processor for use with it.

2. Description of Related Art

The magnetic recording apparatus moves its head radially in relation to a rotating disk to accurately position the head over a target data track and magnetically performs a write or read operation. FIG. 2 shows a top view of the inside of a typical enclosure of the magnetic recording apparatus 1. FIG. 3 is a cross-sectional view of the magnetic recording apparatus. As an example, FIG. 3 shows the magnetic recording apparatus 1, which mainly consists of six heads 2, three disks 3, a rotary actuator 4, a voice coil motor 5, a head amplifier 6, and a package board. The three disks 3 are fastened to a rotation shaft, and rotated around point A when driven by a spindle motor at a speed of 3,000 to 15,000 revolutions per minute. The six heads 2 are fastened to a comb-shaped arm, and rotated around point B when driven by the rotary actuator 4. Thanks to this mechanism, the heads 2 can freely move in the radial direction over the disks 3. Since the rotary actuator 4 is suitable for mechanism downsizing, the actuators employed for recently released magnetic recording apparatuses are of the same type as the rotary actuator 4. Further, the disks 3 have servo areas 7, which are provided at nearly equal angular intervals, to detect the radial positions of the heads 2. The locations of the servo areas 7 and data areas 8 and the means for detecting the radial positions of the heads 2 from the servo areas 7 will be detailed later. The package board carries a hard disk controller (HDC), interface circuit, signal processing unit, and other components for control purposes. The head amplifier 6 is often mounted within the enclosure and near the heads 2 for the purpose of enhancing the S/N ratio and transfer rate.

FIG. 4 is an enlarged detail top view of part of a disk 3. The rotary actuator 4 can position the head at any radial position of disk 3. However, the head is fixed at a specific radial position when data is to be read or written. As indicated in FIG. 4, concentric tracks 9 are formed at nearly equal spacing intervals. In the figure, only five tracks 9 are indicated by solid lines for explanation purposes. In reality, however, the tracks 9 are magnetically formed and cannot directly be viewed by any optical means. Further, the figure shows the tracks with their widths magnified. In the actual magnetic recording apparatus 1, however, a total of several tens of thousands of tracks are formed over the entire surface of disks 3 and positioned at spacing intervals of smaller than 1 μm.

Thanks to the technology disclosed by JP-A NO. 222468/1983, special patterns called servo patterns are factory stored on the disks prior to product shipment and widely used to acquire a head position signal for the purpose of following a specific track. The servo patterns are formulated in the servo areas indicated in FIG. 4 and FIG. 5. The servo areas and data areas are isolated from each other by gap sections, which are provided to absorb rotation speed variations. Each data block is divided into sector blocks. Each sector block consists of about 600 bytes and has management information in addition to 512-byte user data. The data areas greatly differ from the servo areas in that the data areas are frequently rewritten by a command from the user, whereas the servo areas are not rewritten after product shipment. About 50 to 100 servo areas are formed on the disk surface and positioned at nearly equal angular intervals. Since the number of data areas is larger than that of the servo areas, there are several data areas between certain servo areas. In reality, the magnetic recording apparatus has more than 10,000 tracks. However, the contents of FIG. 6 are enlarged significantly in the vertical direction. The servo area is a pattern in which radially adjacent tracks are time-synchronized in the bit direction. For the formation of such a special pattern, a clock synchronized with disk rotation is needed. The servo track writer, which has such a special pattern formation function, is used in conjunction with the technology disclosed by JP-A No. 48276/1989 to formulate the servo areas.

Within the pattern illustration in FIG. 6, the ISG (Initial Signal Gain) block is a continuous pattern that is provided to reduce the influence of disk recording film magnetic characteristics and levitation irregularities. The servo demodulator circuit turns ON the auto-gain control (AGC) to reproduce the ISG block. When the SVAM (Servo Address Mark) block is detected, the AGC is turned OFF to standardize the subsequent reproduced amplitude of the burst block with the ISG block amplitude. Further, when the SVAM is detected, the reproduction system switches to the servo mode for the detection of a gray code, servo sync, and the like. The gray code block is a place where the track number information about each track is written in gray code. In this block, the sector number information may also be written. The burst block is a houndstooth check pattern for acquiring the accurate information about radial position. It is necessary for accurate track following by the head. This pattern consists of a set of A and B bursts and a set of C and D bursts. The A and B bursts equally extend over the center of each track. The C and D bursts equally extend over the centers of adjacent tracks. The pad block is a pattern for absorbing the delay in the demodulator circuitry in order to assure continued clock generation for the period of servo area reproduction by the servo demodulator circuit.

As shown in FIG. 7, the gray code block uses a set of two magnetization changes (dibit) to represent information, achieves equalization with a filter similar in characteristics to a dibit waveform matched filter, and effects demodulation according to a signal amplitude level judgment.

The longitudinal magnetic recording method does not respond to DC magnetization and generates a single-peaked output in relation to magnetization changes only. Therefore, the reproduced waveform derived from recorded magnetization shown in FIG. 8A looks like FIG. 8B. When double-layer perpendicular media having a soft magnetic under layer are used, the resulting reproduced waveform contains a DC component as shown in FIG. 8C. Since the actual reproduction circuitry shuts out the DC component, the resulting reproduced waveform is distorted. Therefore, when integrating detection is attempted, the correct position signal will not be obtained due to the influence of the DC offset. Even when integrating detection is not attempted, the dynamic range of the analog-to-digital converter (ADC) needs to be provided with a margin for distortion. Therefore, inadequate quantization accuracy results. As indicated in FIG. 7, the reproduced waveform in the gray code block is obviously different from a situation where longitudinal recording media are used. It means that gray code demodulation cannot be achieved by conventional LSIs.

Further, the burst signal in the gray code block or burst block is surrounded by a large DC erasure block as shown in FIG. 6. The shorter the wavelength, the smaller the demagnetizing field strength within recording bits. Therefore, the double-layer perpendicular recording method is characterized by the fact that the degree of thermal demagnetization increases with an increase in the wavelength. FIG. 9 deals with typical simulation results and shows the chronological changes in the reproduced output at various recording densities. The figure indicates that the degree of output reduction increases with a decrease in the recording density or an increase in the bit wavelength. Owing to the same effects, the magnetic field generated due to aforementioned DC erasure block magnetization affects the neighboring servo signal block and promotes thermal demagnetization of the servo signal block.

It is also reported that a shift in the direction of the track width occurs during bit recording depending on whether the edge of a recording bit track agrees with the polarity of prerecorded DC magnetization in situations where DC magnetization is prerecorded. In the servo area, therefore, an edge shift also occurs in like manner, degrading the position signal quality.

Further, the maximum bit length designed for the conventional servo area is greater than the maximum bit length of the data area. In such a state, the servo area exhibits the lowest thermal demagnetization resistance and cannot provide assured reliability.

SUMMARY OF THE INVENTION

To solve the above-mentioned problems, in one preferred aspect of the invention, the magnetic recording apparatus uses a bit length smaller than the servo area basic frequency (burst signal and gray code block dibit bit length) to make recordings in the area within the servo area, which is conventionally used as a DC erasure area or used for recording extremely long wavelengths. As a result, the present invention reduces the servo area demagnetizing field strength, increases the thermal demagnetization resistance, suppresses the shift of the burst signal edge, and improves the servo signal quality. In addition, the present invention can limit the maximum bit length of the servo area until it is equal to or smaller than the data area's maximum bit length, thereby offering assured reliability. To permit servo area recording method changes, the present invention can use an LSI that provides a means of varying the filter characteristic setting.

More specifically, the gray code block is recorded with a combination of two different magnetization directions. When the two different magnetization directions are expressed as "+" and "−", the information "1" is recorded as "++−−" or "−−++" with the information "0" recorded as "+−+−" or "−+−+". Conventionally, the information "1" was recorded as "++−−" or "−−++" with the information "0" recorded as "−−−−" or "++++". Further, a signal processor is employed so as to permit the selective use of matched filter characteristics for demodulating the servo area's gray code block information, including two types of responses, which can be expressed as h (t)*(−1+D) and h (t)*(1−D+D^2) where the single-peaked impulse response is h (t) and the delay equivalent to the gray code block basic bit length is D.

Other and further objects, features and advantages of the invention will appear more fully from the following description.

DETAILED DESCRIPTION OF THE PREFERRED EMBODIMENTS

First Exemplary Embodiment

A first preferred embodiment is a signal processing LSI, which can use a register to change the continuous time filter setting in the servo mode in accordance with the characteristics suitable for the conventional servo area signal or servo area signal without long bits and the longitudinal or perpendicular waveform recordings.

Figure 10:
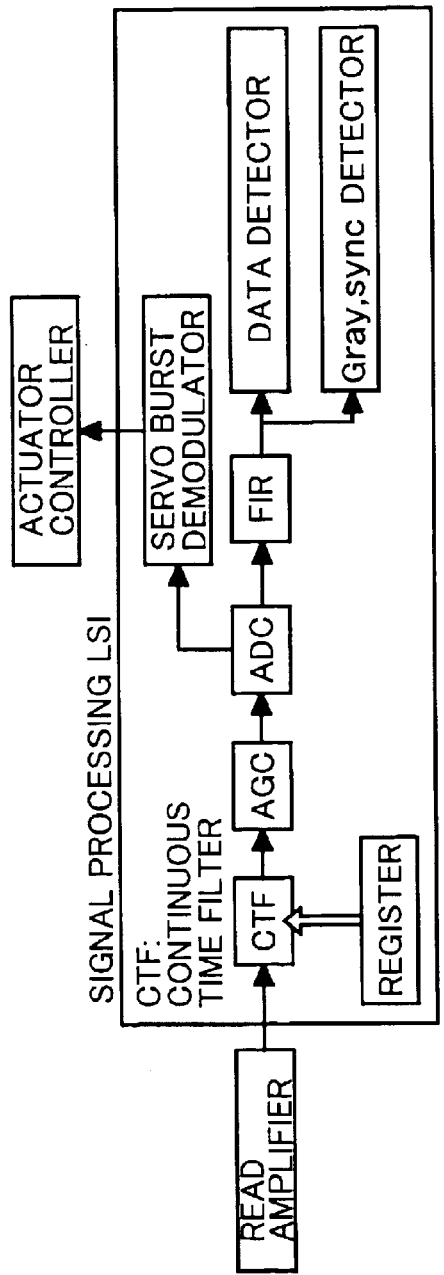
FIG. 10 is a signal processing LSI diagram of the first preferred embodiment of the present invention.

FIG. 10 is a diagram showing the structure of the LSI of the first preferred embodiment. This LSI has a programmable analog filter (CTF: Continuous Time Filter) at its input and performs sampling with an analog-to-digital converter (ADC: Analog-to Digital Converter) to carry out data and servo system processing. In the data mode, the LSI performs an LPF process or differentiation process with the CTF, carries out sampling with the ADC, achieves equalization with the FIR filter, effects maximum-likelihood decoding with the data detector system, and then performs a data read operation while, for instance, making error corrections. In the servo mode, on the other hand, the LSI performs a matched filtering process with the CTF, carries out sampling with the ADC, achieves equalization with the FIR filter (servo mode), effects demodulation of servo sync and the like, and demodulates the position signal from the burst signal to feed information to the positioning control system.

Figure 11:
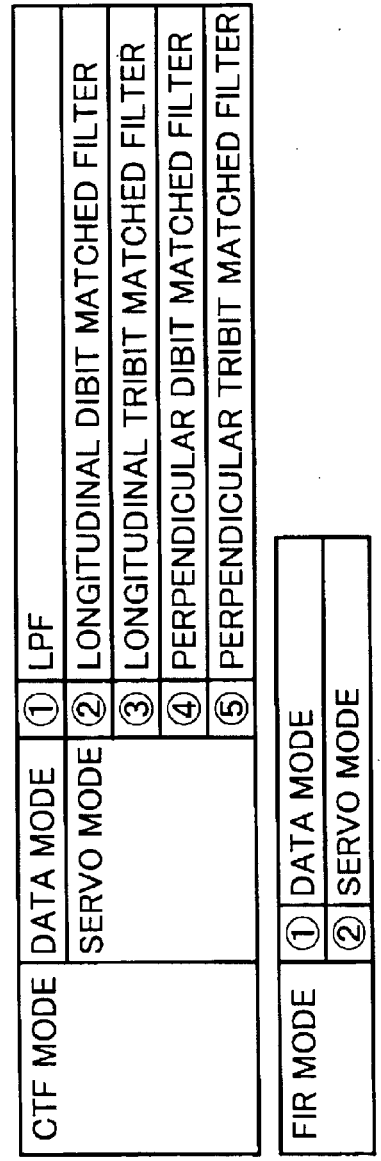
FIG. 11 illustrates the signal processing LSI filter modes in accordance with the first preferred embodiment of the present invention.

As indicated in the table in FIG. 11, the CTF and FIR has two or more operation modes. These modes can be selectively used as needed. Operation mode setup is performed by the register shown in FIG. 10. The controller in the LSI, which is not shown in the figure, automatically determines the setting in the register and changes the operation mode accordingly.

Figure 12:
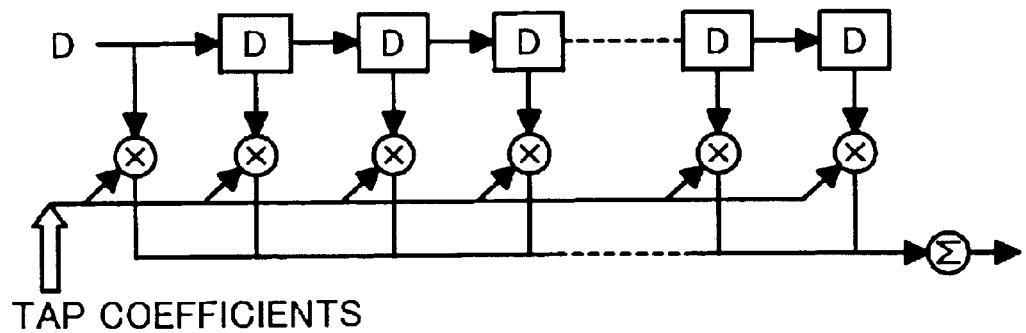
FIG. 12 illustrates the CTF structure in accordance with the first preferred embodiment of the present invention.

FIG. 12 shows the structure of the CTF. The CTF is a transversal filter that consists of an analog delay circuit and multiplier. When arbitrary tap coefficients are given to it, it yields a certain characteristic.

Figure 13:
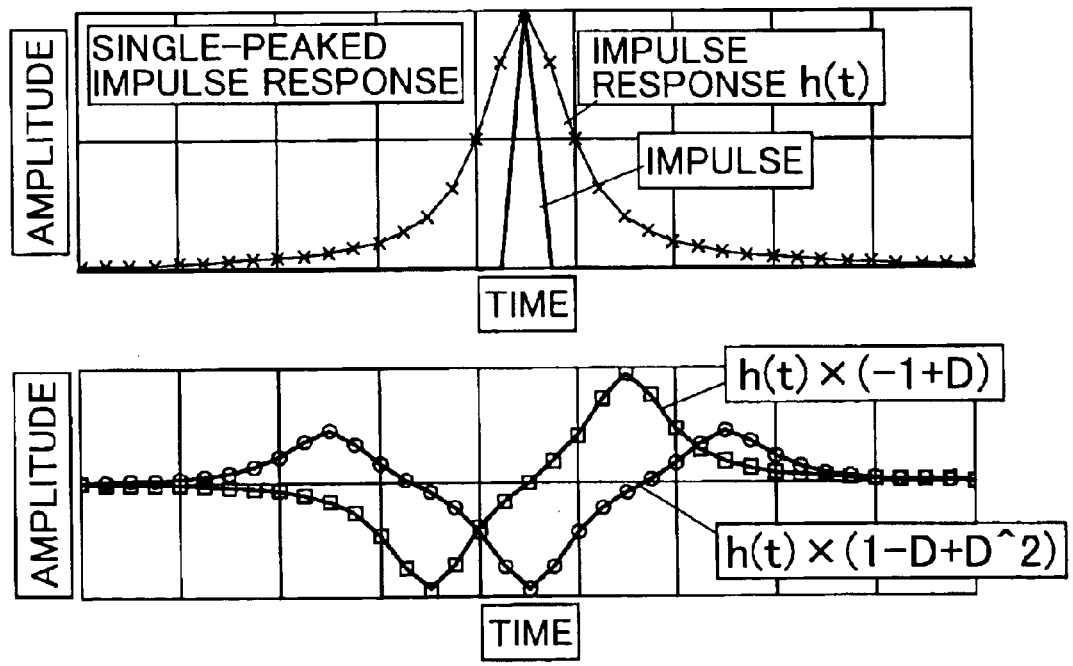
FIG. 13 illustrates the signal processing LSI filter characteristics in accordance with the first preferred embodiment of the present invention.
Figure 14:
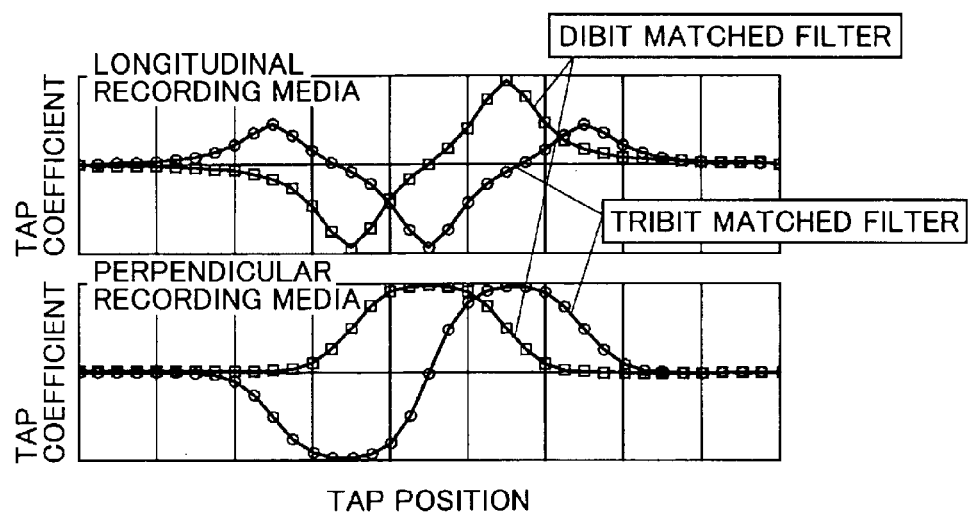
FIG. 14 illustrates the tap coefficients prevailing when a transversal filter is used as a servo mode matched filter.

Switching between the servo mode and data mode can be effected in accordance with the decision that is automatically made by the LSI. However, the CTF characteristic for the servo mode can also be defined beforehand by specifying the register setting from the outside. In the first preferred embodiment, a total of four matched filter settings are provided. More specifically, the longitudinal+tribit, perpendicular+dibit, and perpendicular+tribit matched filter settings are provided in addition to the longitudinal-waveform-ready dibit matched filter setting, which is conventionally provided for the LSI. These matched filter settings can be selected from the outside depending on the head, media, and servo area system. When the delay equivalent to the servo basic bit length is D and the single-peaked impulse response shown in FIG. 13 is h (t), the longitudinal matched filter can be expressed as $h(t)*(-1+D)$ and the longitudinal tribit matched filter can be expressed as $h(t)*(1-D+D^2)$. Their respective impulse responses are shown in the same figure. When a single-peaked impulse response different from the longitudinal counterpart is g (t), the perpendicular dibit matched filter can be expressed as $g(t)$ and the perpendicular tribit matched filter can be expressed as $g(t)*(-1+D)$. The values h (t) and g (t) can be changed by varying the register setting in accordance with the head-media combination. FIG. 14 shows typical tap coefficients for cases where the matched filters are implemented through transversal filter use. As indicated in the figure, there is a great difference in the filter characteristic between the dibit and tribit matched filters and between the longitudinal and perpendicular media.

It goes without saying that the LSI of the first preferred embodiment has functions found in the conventional LSIs, such as timing extraction functions and FIR filter learning functions.

Second Exemplary Embodiment

The second preferred embodiment is functionally the same as the first preferred embodiment. The second preferred embodiment differs from the first one in that a combination of a high-pass filter, low-pass filter, and all-pass filter is used for the CTF circuitry instead of a transversal filter. It is a signal processing LSI that varies the characteristic by changing the variable resistor and variable capacitor values.

Figure 15:
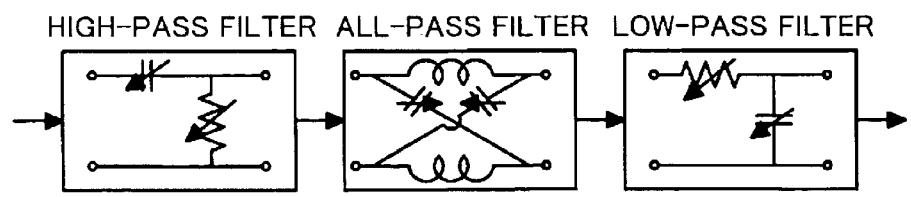
FIG. 15 illustrates the CTF structure in accordance with the second preferred embodiment of the present invention.

FIG. 15 shows the CTF structure. As indicated in the figure, the second preferred embodiment consists of a resistor, capacitor, and inductor. The values of the resistor and capacitor are variable and can be set from the outside.

In the second preferred embodiment, first-order filters are combined to configure the CTF. However, the CTF can also be configured with a combination of second- or higher-order filters.

Third Exemplary Embodiment

Figure 16:
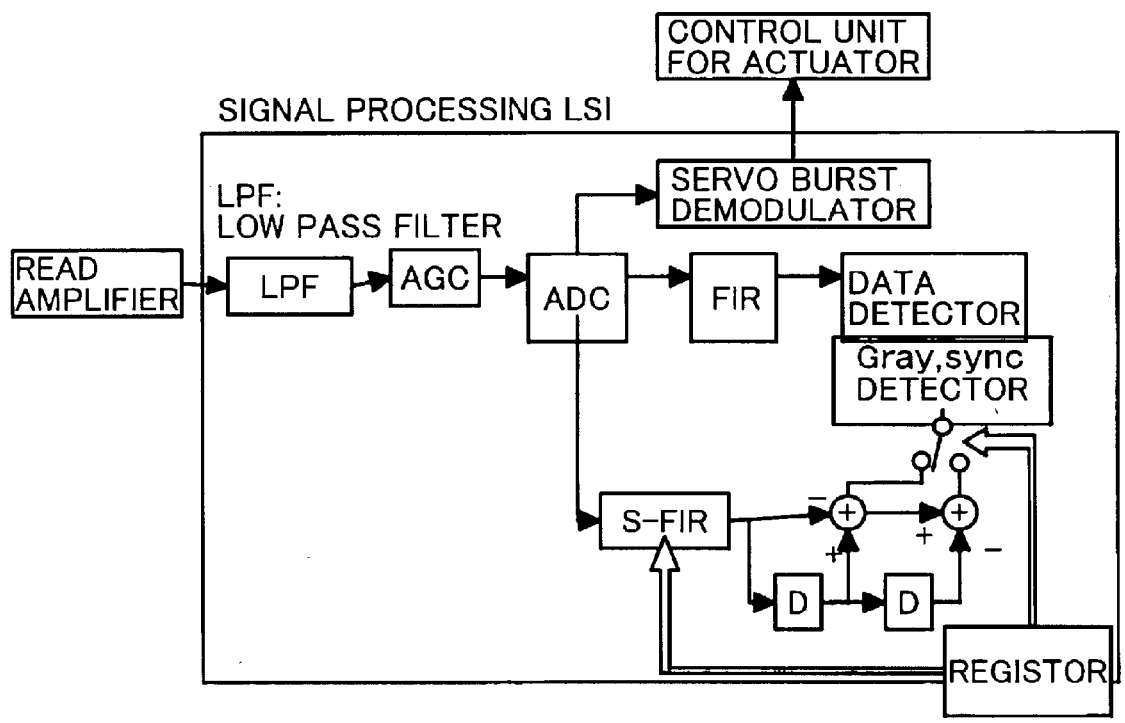
FIG. 16 is a signal processing LSI diagram of the third preferred embodiment of the present invention.

The third preferred embodiment is functionally the same as the first preferred embodiment. However, the third preferred embodiment is a signal processing LSI that uses servo mode matched filters based on digital circuitry. FIG. 16 shows a schematic diagram of the signal processing LSI of the third preferred embodiment. As indicated in the figure, this signal processing LSI is not only provided with a digital FIR for the servo mode but also equipped with a circuit consisting of a delay device and adder and permitting a changeover between "1−D" and "1−D+D^2". The filter characteristic changeover is the same as stated in the description of the first preferred embodiment.

Fourth Exemplary Embodiment

Figure 17:
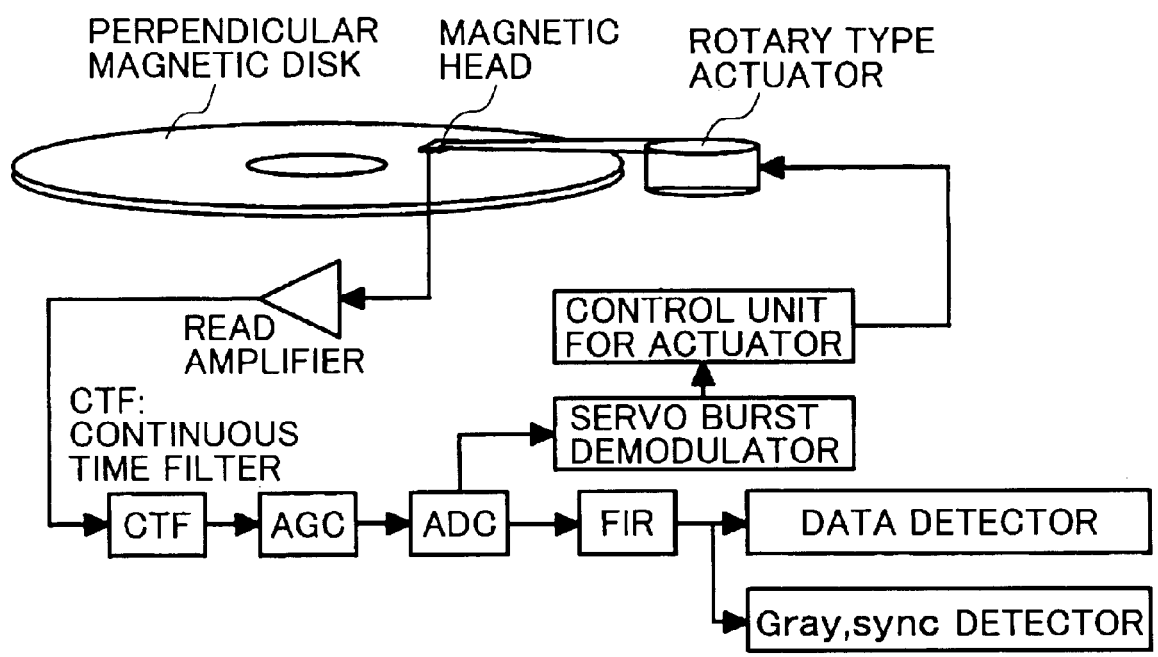
FIG. 17 is a magnetic recording apparatus diagram of the fourth preferred embodiment of the present invention.

The fourth preferred embodiment is a magnetic recording apparatus, which incorporates a signal processing LSI stated in the description of the first preferred embodiment, uses perpendicular magnetic recording media, and has servo areas without long bits. The schematic diagram is shown in FIG. 17. The CTF for the servo mode is set for the perpendicular tribit matched filter characteristic.

Figure 1:
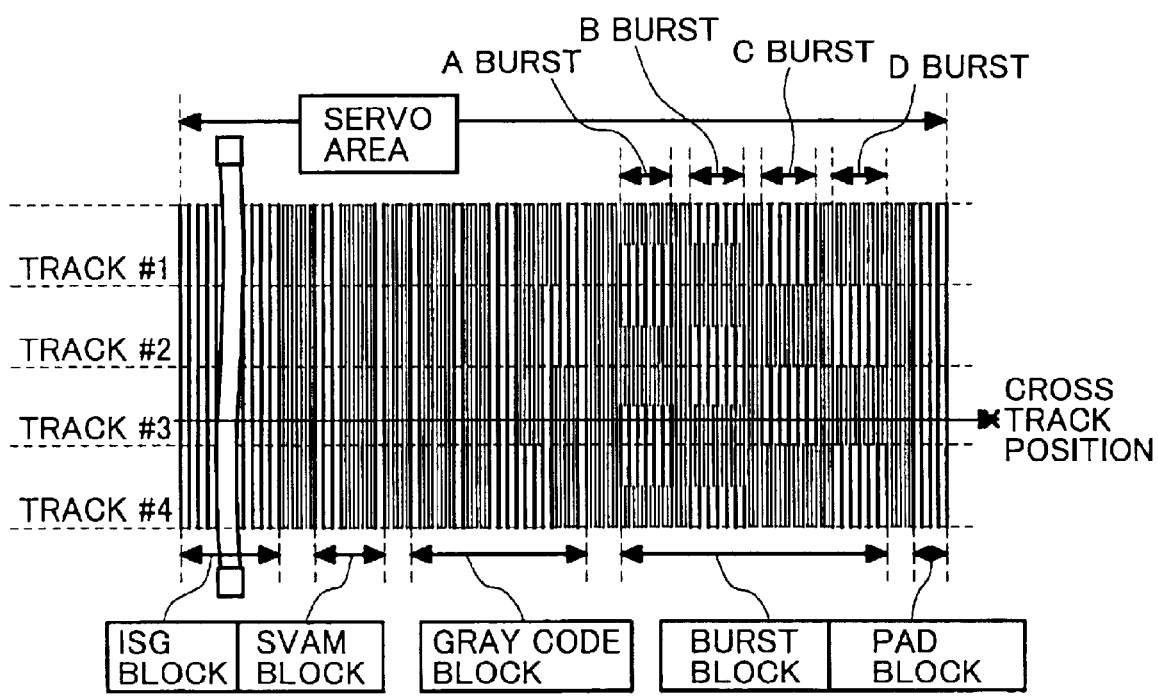
FIG. 1 illustrates servo area recording patterns of the present invention.
Figure 2:
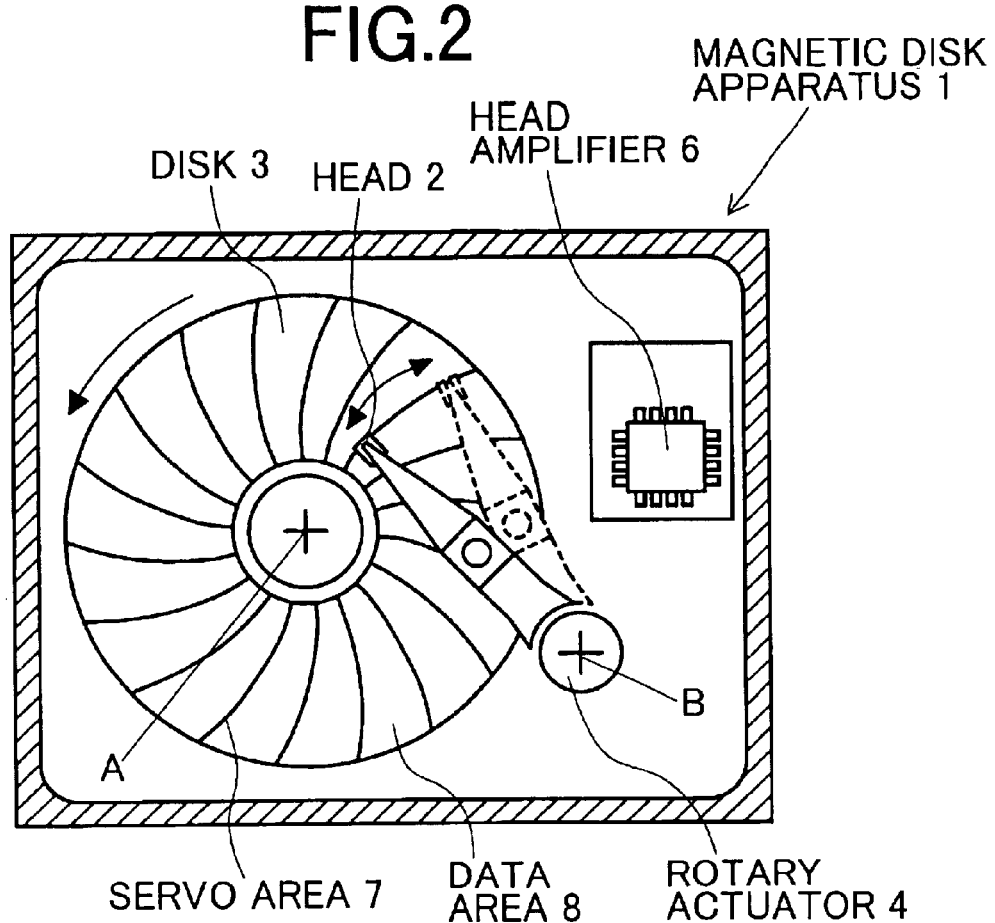
FIG. 2 is a top view illustrating the structure of a general magnetic recording apparatus.
Figure 3:
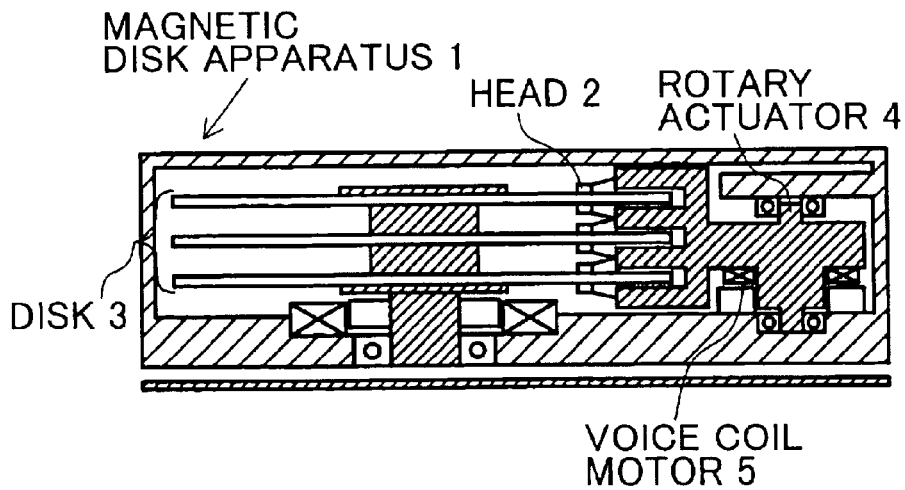
FIG. 3 is a cross-sectional view illustrating of the structure of a general magnetic recording apparatus.
Figure 4:
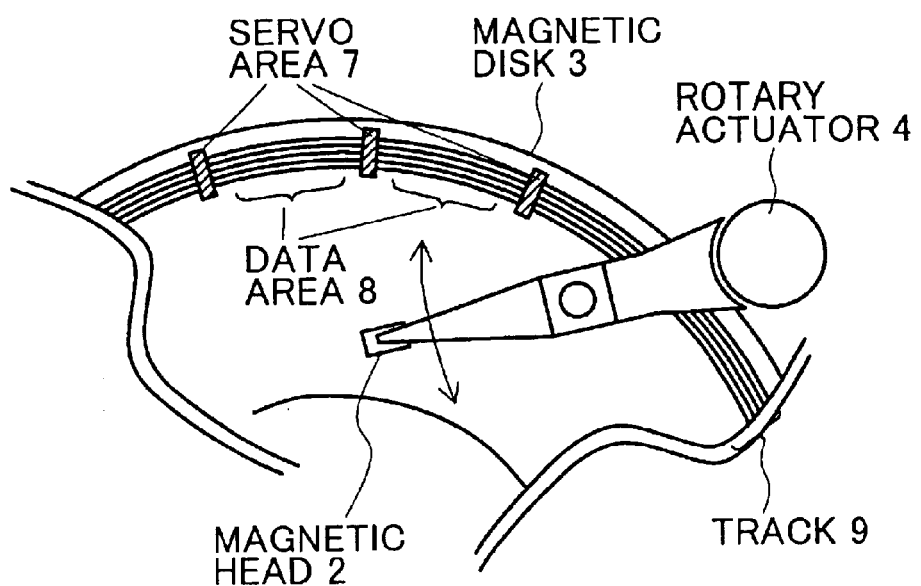
FIG. 4 is an enlarged view illustrating of the structure of a general magnetic recording apparatus.
Figure 5:
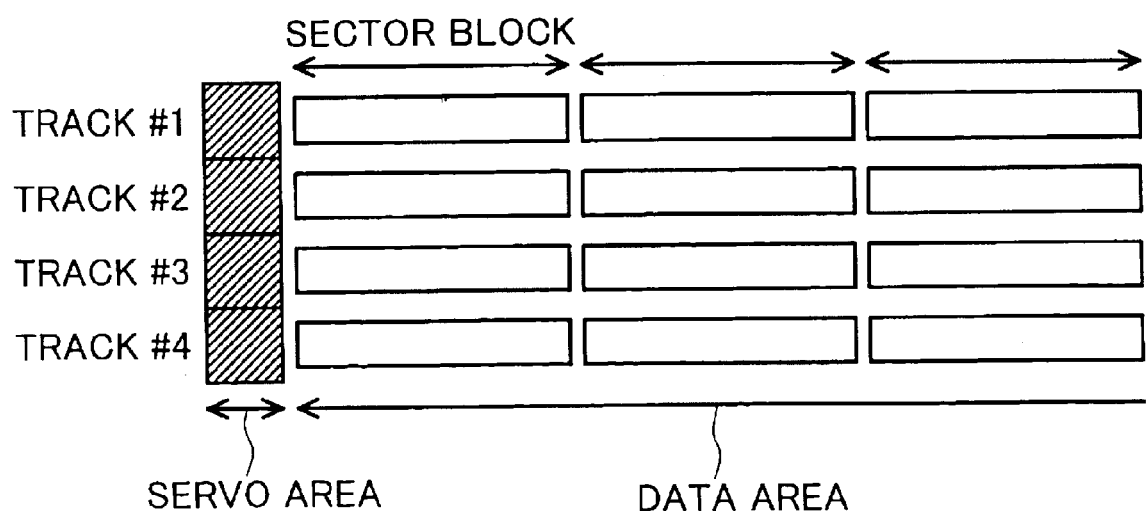
FIG. 5 illustrates the track structure of a general magnetic recording apparatus.
Figure 6:
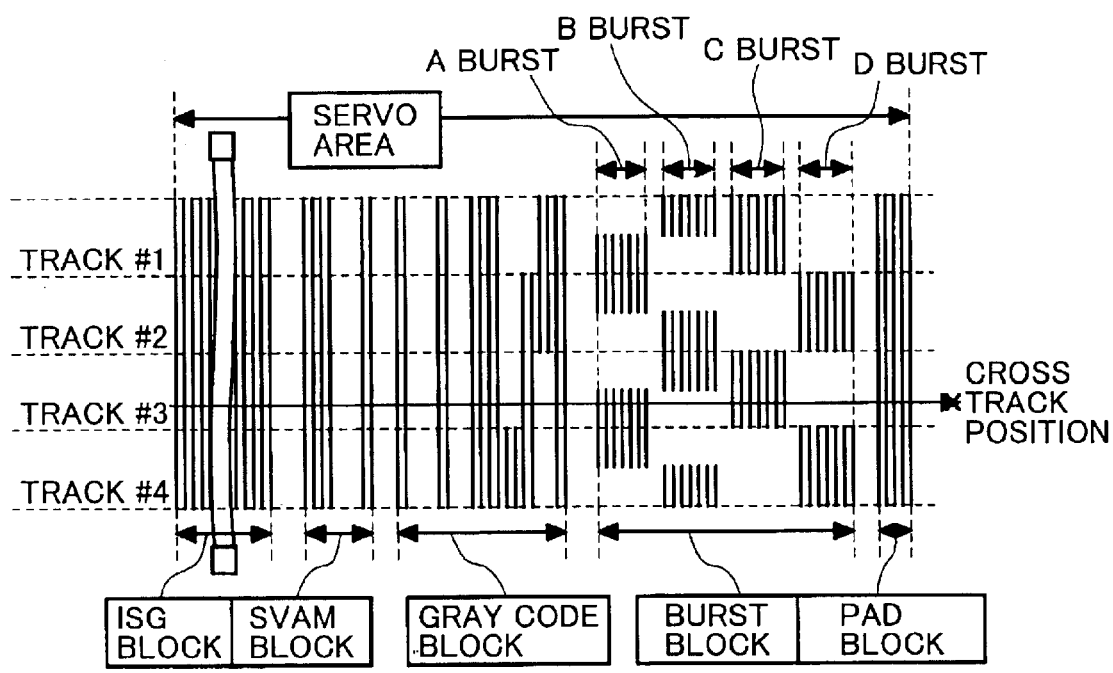
FIG. 6 illustrates servo area patterns of a general magnetic recording apparatus.
Figure 7:
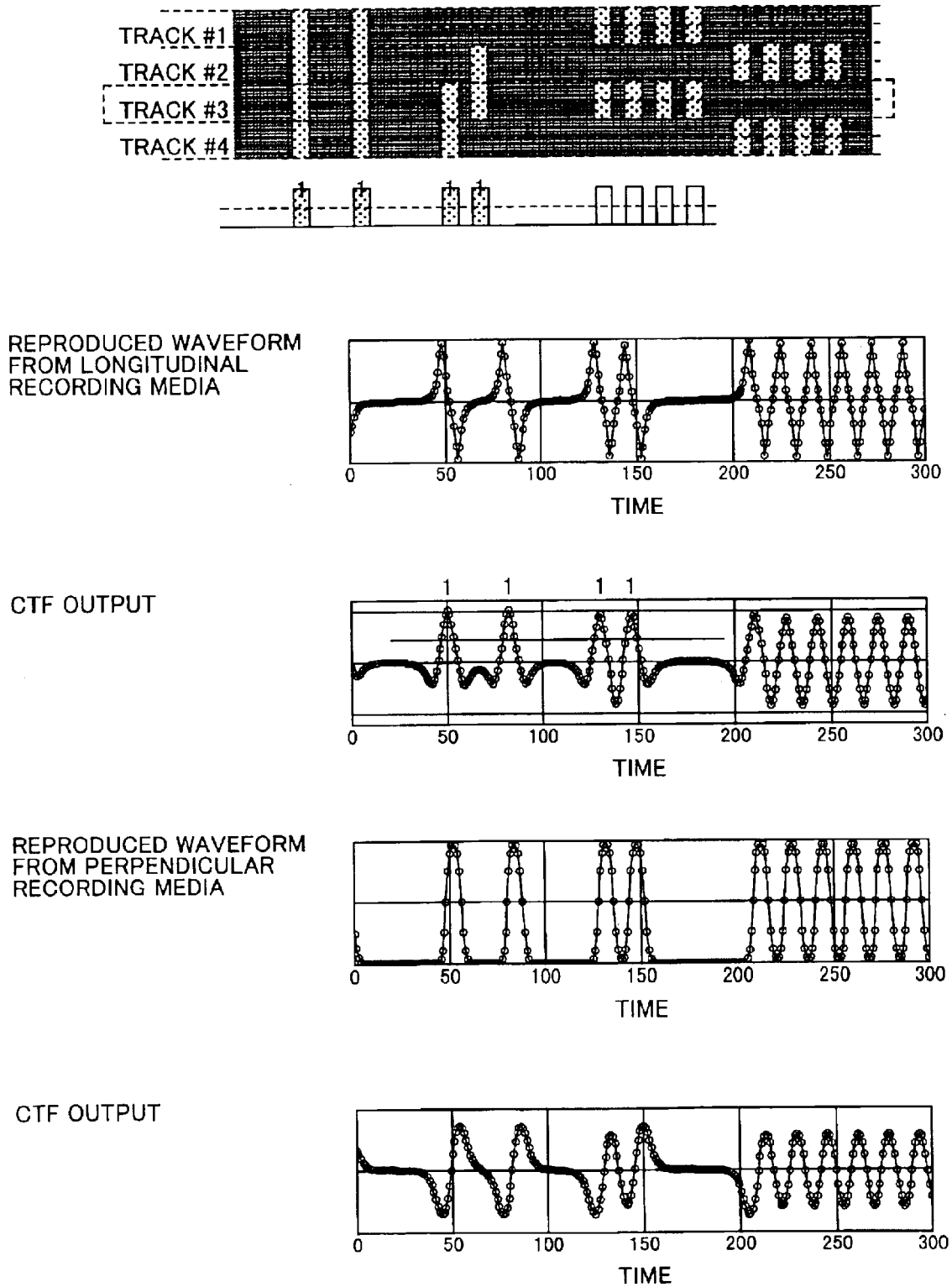
FIG. 7 illustrates servo area patterns and reproduced waveforms of a general magnetic recording apparatus.
Figure 8A:
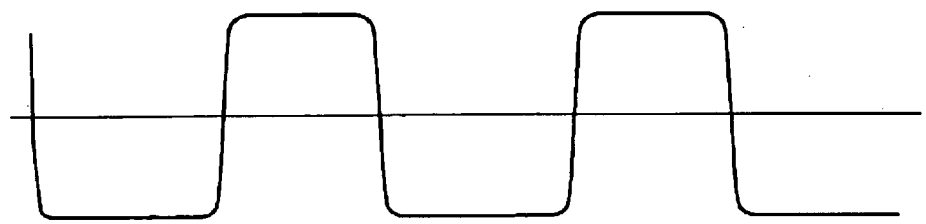
FIG. 8A shows a recorded magnetization pattern.
Figure 8B:
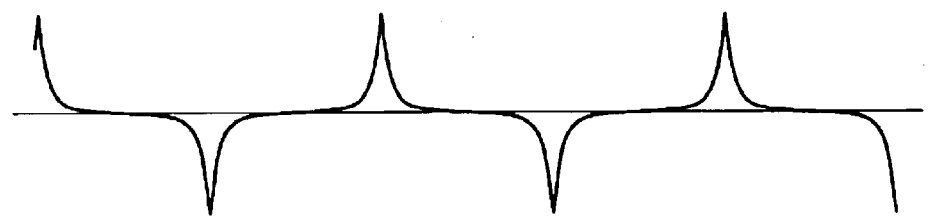
FIG. 8B shows a readback waveform of longitudinal recording.
Figure 8C:
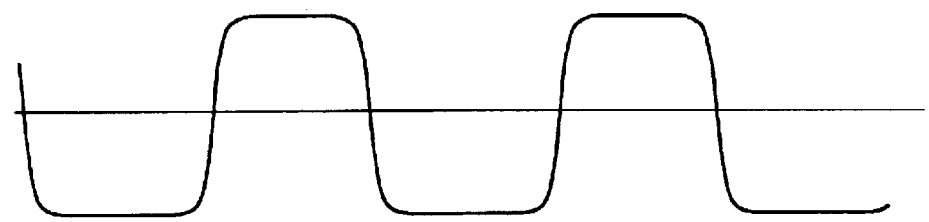
FIG. 8C shows a readback waveform of perpendicular recording.
Figure 9:
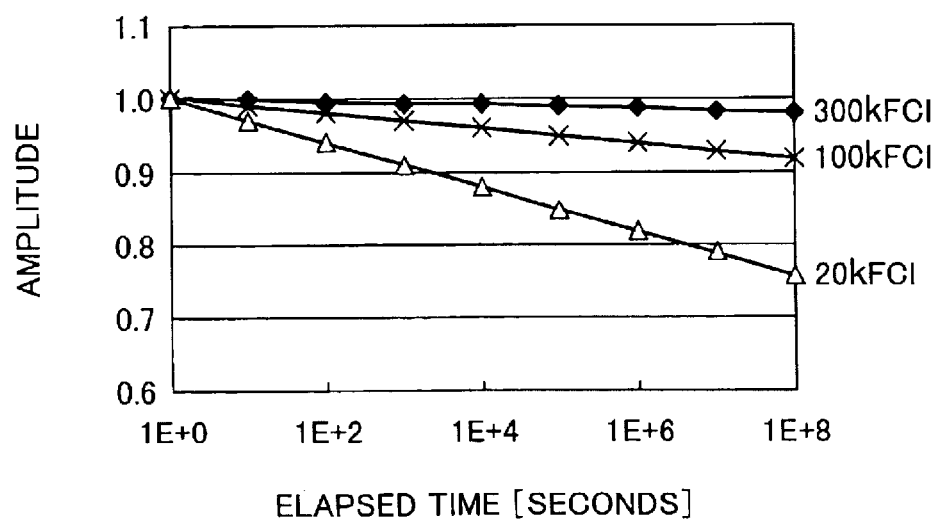
FIG. 9 illustrates the thermal demagnetization characteristic of perpendicular magnetic recording.
Figure 18A:
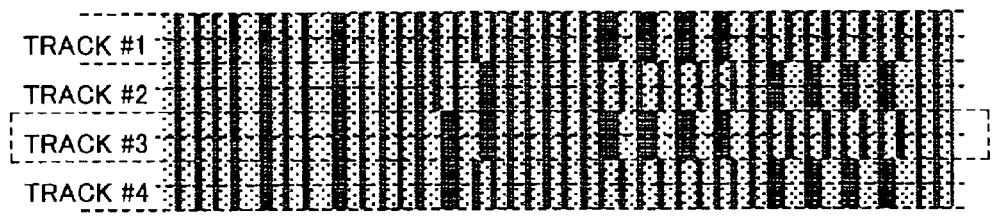
FIG. 18A illustrates servo area patterns of the fourth preferred embodiment of the present invention.

As shown in FIGS. 1 and 18A (enlarged views), the servo area is filled with signals having half the bit length equivalent to the servo basic frequency as well as gray codes recorded with a bit length equivalent to the servo basic frequency (basic bit length), burst signal, and other signals. Therefore, no existing bits are longer than the basic bit length.

Figure 18B:
FIG. 18B illustrates the magnetized state of track No. 3 that is indicated in FIG. 18A.
Figure 18C:
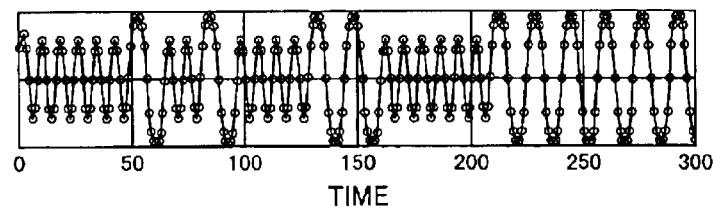
FIG. 18C illustrates a reproduced waveform that is derived from perpendicular recording media.
Figure 18D:
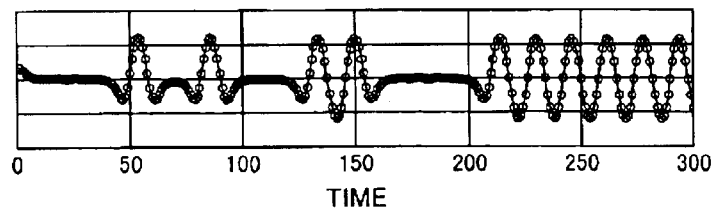
FIG. 18D illustrates a perpendicular CTF output.

The magnetized state of track No. 3 in FIG. 18A is as indicated in FIG. 18B. It can be divided into the section in which a pair of "+" magnetization and "−" magnetization (tribit) represents the information "1" and the section in which recordings are made using half the basic bit length to represent the information "0". When half the servo basic bit length is used as the unit of notation, the gray code block is recorded using a combination of two different magnetization directions. When the two different directions of magnetization are expressed as "+" and "−", respectively, the information "1" is recorded with "++−−" or "−−++" and the information "0" is recorded with "+−+−" or "−+−+". The resulting reproduced waveform looks like FIG. 18C and the information "1" yields a pair of positive and negative pulses. When the perpendicular tribit matched filter is used for processing, the result looks like FIG. 18D and the information "1" yields a pulse whose amplitude is greater on the positive side. The amplitude is then determined to demodulate the gray code block.

Fifth Exemplary Embodiment

Figure 19:
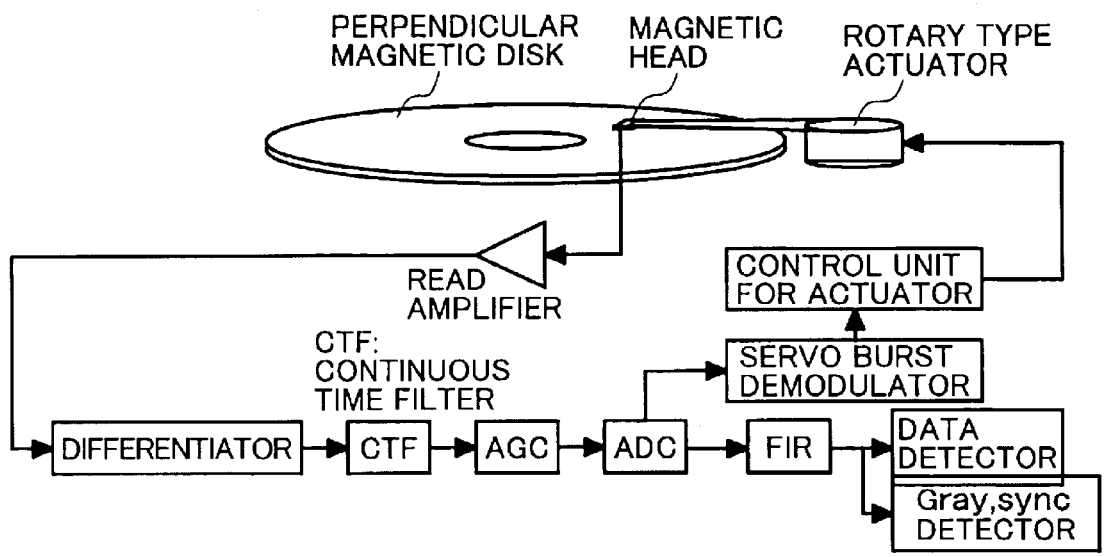
FIG. 19 is a magnetic recording apparatus diagram of the fifth preferred embodiment of the present invention.

The device configuration for the fifth preferred embodiment is basically the same as that for the fourth preferred embodiment. As indicated in FIG. 19, however, the fifth preferred embodiment differs from the fourth one in that a differentiator is provided at an input of the LSI to differentiate the reproduced waveform. The waveform obtained by differentiating the reproduced waveform of a perpendicular recording is similar to the waveform of a longitudinal recording, and the CTF for the servo mode is set for the longitudinal tribit matched filter characteristic.

Figure 20A:
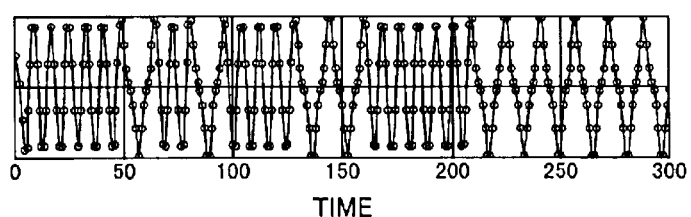
FIG. 20A illustrates a differentiated waveform of perpendicular recording in a servo area in accordance with the fifth preferred embodiment of the present invention.
Figure 20B:
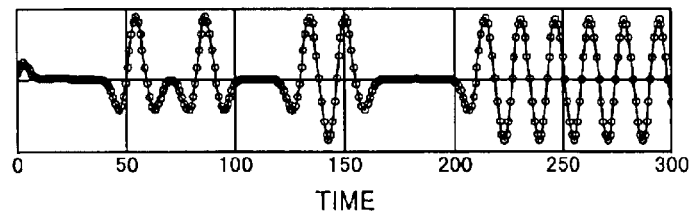
FIG. 20B illustrates a CTF output of waveform shown in FIG. 20A.

When the reproduced waveform of track No. 3 in FIG. 18A is differentiated, the result looks like FIG. 20A. When the longitudinal tribit matched filter is used for processing, the result looks like FIG. 20B and the information "1" yields a pulse whose amplitude is greater on the positive side. The amplitude is then determined to demodulate the gray code block.

Figure 21A:
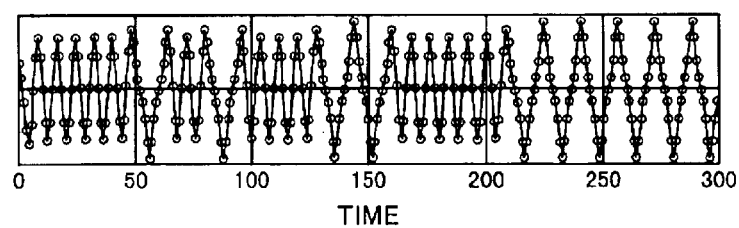
FIG. 21 illustrates a servo area's reproduced waveform that is derived from longitudinal recording media in accordance with the fifth preferred embodiment of the present invention.
Figure 21B:
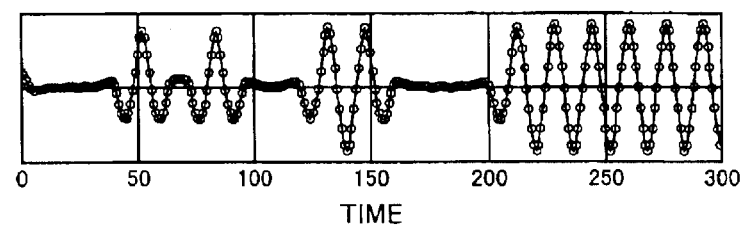

The fifth preferred embodiment uses a combination of perpendicular recording media and differentiator. However, even when longitudinal recording media are used without a differentiator, the reproduced waveform of track No. 3 remains virtually the same as indicated in FIG. 21. Therefore, gray code block demodulation can be achieved with the same settings.

Sixth Exemplary Embodiment

The sixth preferred embodiment is a magnetic recording apparatus, which uses a conventional recording method for the servo areas and has double-layer perpendicular recording media and a signal processing LSI stated in the first preferred embodiment description. The perpendicular recording tribit matched filter is selected as the CTF for the servo mode.

Figure 22A:
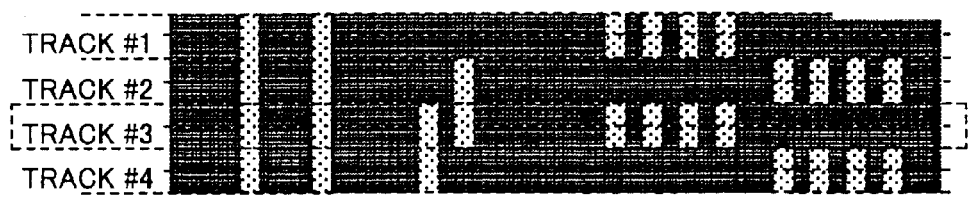
FIG. 22A illustrates servo area patterns of the sixth preferred embodiment of the present invention.
Figure 22B:
FIG. 22B illustrates the magnetized state of track No. 3 that is indicated in FIG. 22A.
Figure 22C:
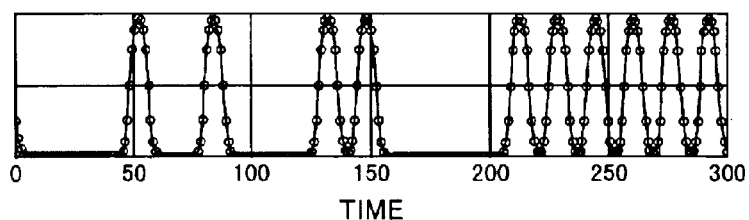
FIG. 22C illustrates a reproduced waveform that is derived from perpendicular recording media.
Figure 22D:
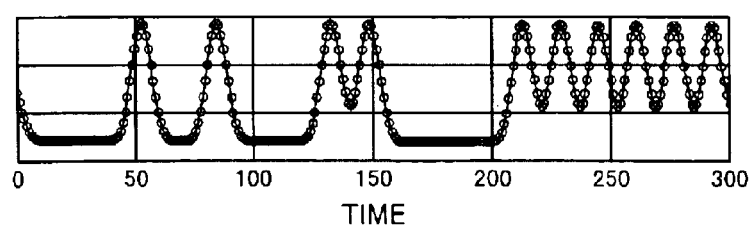
FIG. 22D illustrates a perpendicular CTF output.

Even when a conventional servo area recording method shown in FIG. 22A is used, the signal processing LSI stated in the first preferred embodiment description can be used. The reproduced waveform of the gray code block looks like FIG. 22C. It looks like FIG. 22D when the CTF output is used. Gray code demodulation is achievable depending on amplitude level detection.

Figure 23:
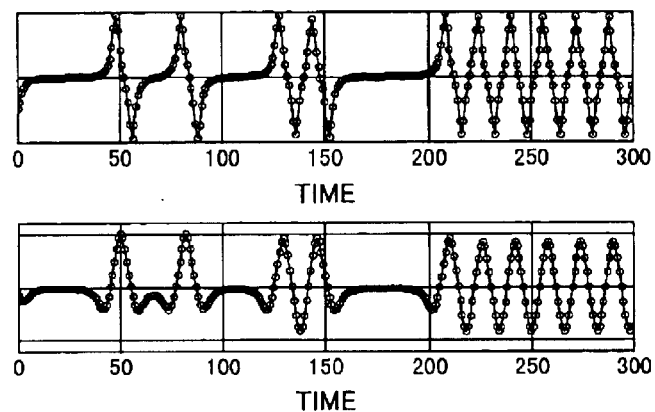
FIG. 23 illustrates a servo area's reproduced waveform that is derived from longitudinal recording media in accordance with the sixth preferred embodiment of the present invention.
Figure 24:
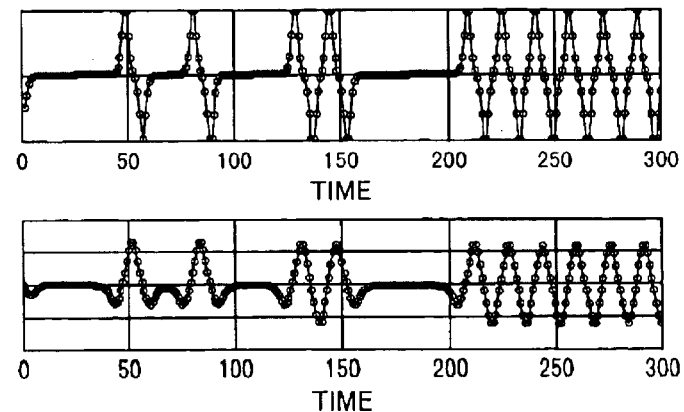
FIG. 24 illustrates a servo area's reproduced waveform that is derived when perpendicular recording media is used with a differentiator in accordance with the sixth preferred embodiment of the present invention.

The sixth preferred embodiment uses double-layer perpendicular recording media. However, it is also applicable to the combination with a conventional servo area recording method and to the combination of longitudinal recording media or double-layer perpendicular recording media plus a differentiator. FIGS. 23 and 24 show the examples of reproduced waveforms.

In the preferred embodiments, perpendicular magnetic recording media having a soft magnetic under layer is used. However, even when perpendicular magnetic recording media having no soft magnetic under layer is used, the idea of thermal demagnetization remains unchanged so that the lower the signal density, the higher the degree of thermal demagnetization. Although a different waveform is reproduced, the servo block process can be performed in exactly the same manner. Consequently, the present invention is valid even when perpendicular magnetic recording media without a soft magnetic under layer is used.

In a modification of the above-mentioned arrangement, a signal processor having an analog filter, an ADC for receiving the output signal from the analog filter, and an FIR filter for receiving the output signal from the ADC can be used. The analog filter has two operation modes, whose filter characteristics are h (t)×(−1+D) and h (t)×(1−D +D^2), respectively, when the impulse response is h (t) and the bit delay is D. In addition, the signal processor incorporates a means for choosing between the two operation modes.

In a second modification of the above-mentioned arrangement, a signal processor having an analog filter, an ADC for receiving the output signal from the analog filter, and an FIR filter for receiving the output signal from the ADC can be used. The analog filter has two filter circuits, whose filter characteristics are h (t)×(−1+D) and h (t)×(1−D+D^2), respectively, when the impulse response is h (t) and the bit delay is D.

In a third modification of the above-mentioned arrangement, a signal processor described above can switch between the above-mentioned two operation modes with a register that stores the operation modes.

The present invention permits a magnetic recording apparatus with perpendicular magnetic recording media to use the same servo control method as for longitudinal recording, making it possible to reduce the development cost. Further, the present invention provides thermal stability because it does not use long-wavelength signals that are susceptible to thermal demagnetization. In addition, the burst signal variation in the direction of the track width is suppressed by the present invention so that positioning can be achieved with a highly accurate positioning signal. As a result, the prevent invention can offer a high-reliability, large-capacity magnetic recording apparatus.

The foregoing invention has been described in terms of preferred embodiments. However, those skilled, in the art will recognize that many variations of such embodiments exist. Such variations are intended to be within the scope of the present invention and the appended claims.

What is claimed is:

1. A magnetic recording apparatus comprising:
   a magnetic head for recording and reproducing information,
   perpendicular magnetic recording media having a servo area for storing servo pattern recordings and a user data area for storing user data recordings, and
   a signal processing means for processing servo information or user data read by said magnetic head,
   wherein said servo area has a burst block in which burst patterns for positioning said magnetic head are recorded and a gray code block in which track information is recorded with patterns of "1" and "0" representing the information indicated by two different perpendicular magnetization directions, and
   wherein said information "1" and said information "0" are recorded respectively with a "++−−" pattern and a combination of "+−" patterns, or said information "1" and said information "0" are recorded respectively with a "−−++" pattern and a combination of "−+" patterns when said two different perpendicular magnetization directions are expressed as "+" and "−".

2. The magnetic recording apparatus according to claim 1 wherein said perpendicular magnetic recording media are provided with a soft magnetic under layer.

3. The magnetic recording apparatus according to claim 1 wherein said signal processing means is provided with a matched filter for demodulating a recorded pattern in said gray code block and wherein said matched filter operates in two operation modes in which the filter characteristic is h (t)×(−1+D) or h (t)×(1−D+D^2) where the impulse response is h (t) and the bit delay is D.

4. The magnetic recording apparatus according to claim 3 further comprising a means for choosing between said two operation modes.

5. The magnetic recording apparatus according to claim 4 wherein the means for choosing between said two operation modes within a signal processor is a register that stores the operation modes.

6. The magnetic recording apparatus according to claim 1 wherein said signal processing means is provided with a matched filter for demodulating a recorded pattern in said gray code block and wherein said matched filter has two filter elements whose filter characteristics are h (t)×(−1+D) or h (t)×(1−D+D^2) where the impulse response is h (t) and the bit delay is D.

7. A magnetic recording apparatus comprising:

a magnetic head for recording and reproducing information, perpendicular magnetic recording media having a servo area for storing servo pattern recordings and a user data area for storing user data recordings, and a signal processing means for processing servo information or user data read by said magnetic head, wherein said servo area has a burst block in which burst patterns for positioning said magnetic head are recorded and a gray code block in which track information is recorded with patterns of "1" and "0" representing the information indicated by two different perpendicular magnetization directions, and wherein said information "1" and said information "0" are recorded respectively with a "++−−" pattern and a "+−+−" pattern, or said information "1" and said information "0" are recorded respectively with a "−−++" pattern and a "−+−+" pattern when said two different perpendicular magnetization directions are expressed as "+" and "−".

8. Perpendicular magnetic recording media comprising:

a servo area for storing servo pattern recordings and a user data area for storing user data recordings, wherein said servo area has a burst block in which burst patterns for positioning said magnetic head are recorded and a gray code block in which track information is recorded with patterns of "1" and "0" representing the information indicated by two different perpendicular magnetization directions, and wherein said gray code block records said information "1" and said information "0" respectively with a "++−−" pattern and a combination of "+−" patterns, or said information "1" and said information "0" respectively with a "−−++" pattern and a combination of "−+" patterns when said two different perpendicular magnetization directions are expressed as "+" and "−".

9. Perpendicular magnetic recording media comprising:

a servo area for storing servo pattern recordings and a user data area for storing user data recordings, wherein said servo area has a burst block in which burst patterns for positioning said magnetic head are recorded and a gray code block in which track information is recorded with patterns of "1" and "0" representing the information indicated by two different perpendicular magnetization directions, and wherein said gray code block records said information "1" and said information "0" respectively with a "++−−" pattern and a "+−+−" pattern, or said information "1" and said information "0" respectively with a "−−++" pattern and a "−+−+" pattern when said two different perpendicular magnetization directions are expressed as "+" and "−".

* * * * *